United States Patent [19]

Baba et al.

[11] Patent Number: 4,517,589
[45] Date of Patent: May 14, 1985

[54] COLORED IMAGE READING APPARATUS

[75] Inventors: Takeshi Baba; Kazuhiko Matsuoka, both of Yokohama, Japan

[73] Assignee: Canon Kabushiki Kaisha, Tokyo, Japan

[21] Appl. No.: 433,223

[22] Filed: Oct. 7, 1982

[30] Foreign Application Priority Data

Oct. 13, 1981 [JP] Japan ............................. 56-163632
Oct. 13, 1981 [JP] Japan ............................. 56-163633

[51] Int. Cl.³ ............................................. H04N 1/46
[52] U.S. Cl. ...................................................... 358/75
[58] Field of Search ........................................ 358/75

[56] References Cited

U.S. PATENT DOCUMENTS 4,318,122 3/1982 White ................................... 358/75

Primary Examiner—Richard Murray
Attorney, Agent, or Firm—Fitzpatrick, Cella, Harper & Scinto

[57] ABSTRACT

A colored image reading apparatus has a light source for illuminating the surface of an original, a transmitting optical system for dividing the light beam from the surface of the original into two beams of short wavelength zone and long wavelength zone and transmitting them to a light detector, a processing circuit for effecting an operation between the signals from the light detector and obtaining a plurality of electrical signals, and a converter circuit for converting the plurality of electrical signals into signals corresponding to respective colors, and is capable of well discriminating and reading four colors, black, blue, red and white, by selecting to predetermined values the wavelength λ'b of the overall spectral characteristic on the short wavelength zone side including all of the spectral characteristics of the light source, the transmitting optical system and the light detector relative to the maximum value of the transmission factor and the wavelength λ'r of the overall spectral characteristic on the long wavelength zone side relative to the maximum value of the transmission factor.

6 Claims, 34 Drawing Figures

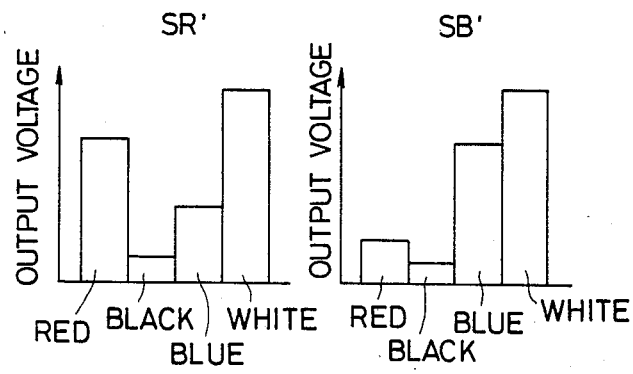
FIG. 9
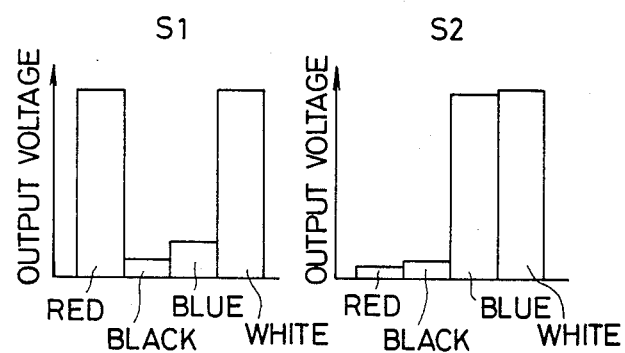
FIG. 10
FIG. 11A
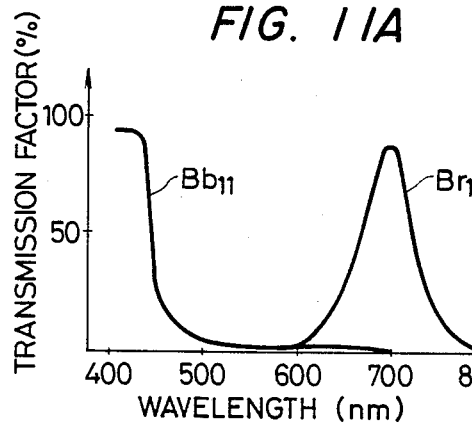
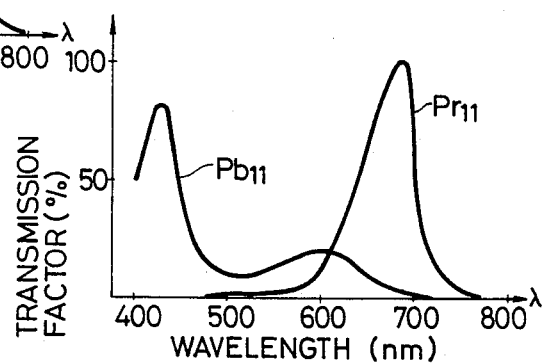
FIG. 11B

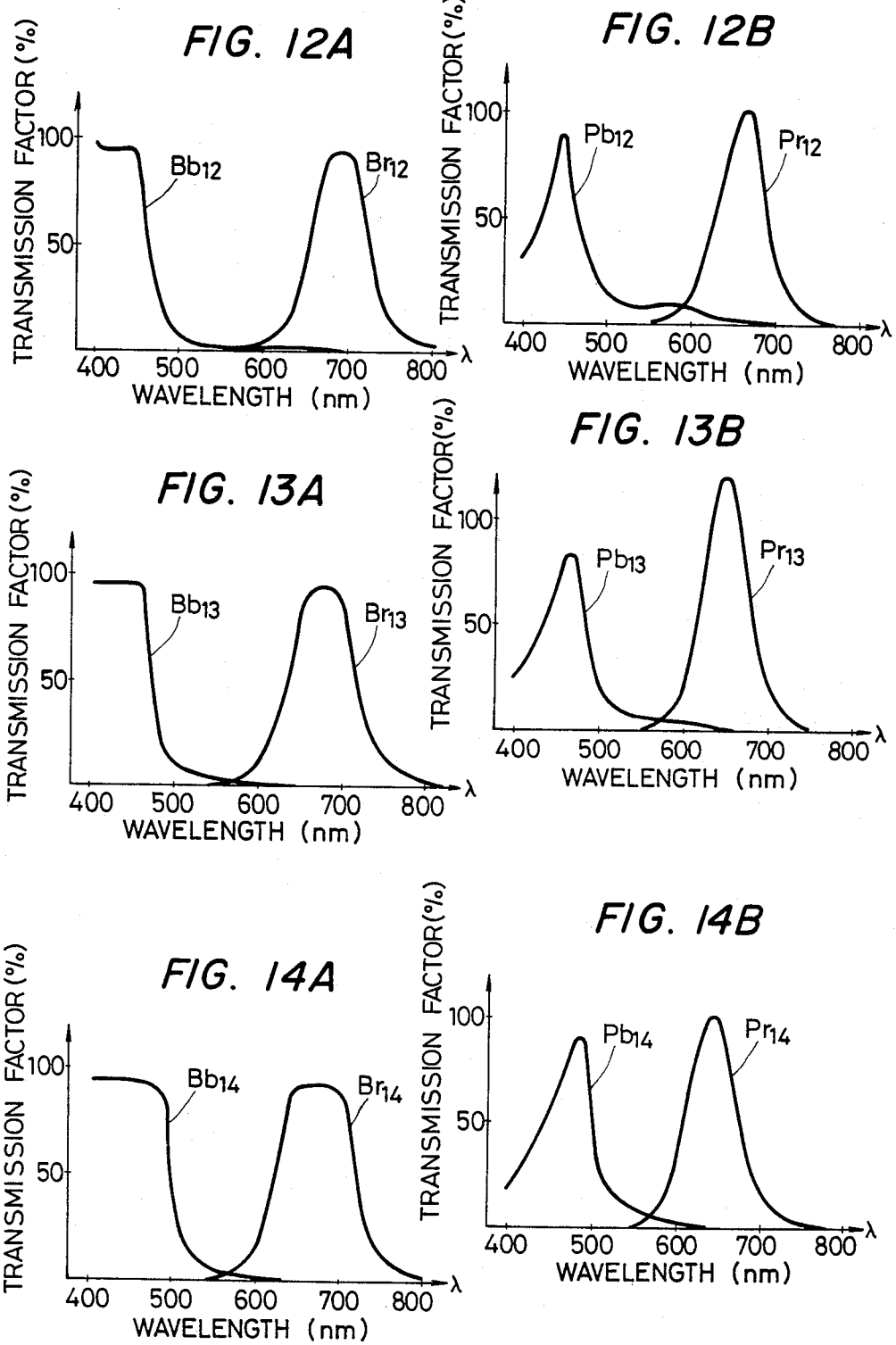

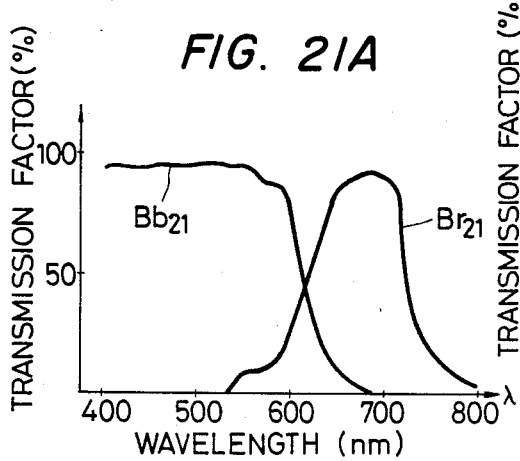
FIG. 21A
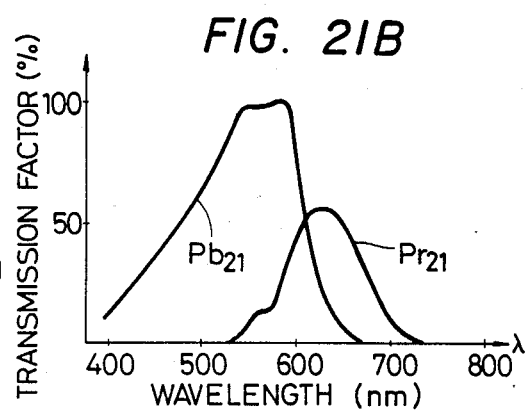
FIG. 21B
FIG. 22
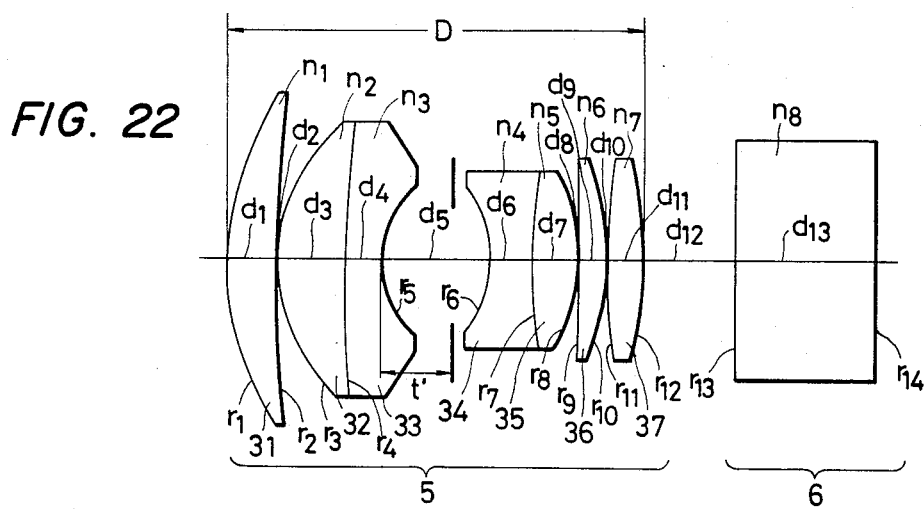
FIG. 23
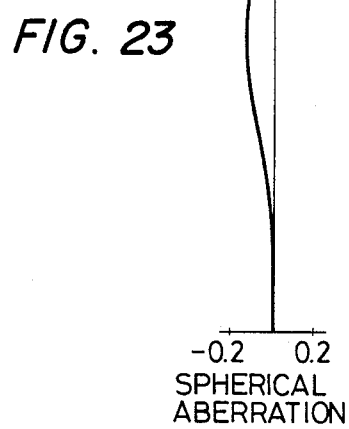

COLORED IMAGE READING APPARATUS

BACKGROUND OF THE INVENTION

1. Field of the Invention

This invention relates to a colored image reading apparatus to be used in a copying apparatus or a facsimile for copying or reprinting original documents or the like, and more particularly to an apparatus for scanning the surface of an original relatively in two directions and reading the information carried on the surface of the original as four types of color information, i.e., black, red, blue and white.

2. Description of the Prior Art

In recent years, there have been proposed image formation apparatus in which the information of an original is read in bit units by a light-receiving element such as a CCD and converted into electrical signals thereby and digitally recorded in accordance with the converted signals. Of the information of ordinary originals such as documents, four types of color information, i.e., black, red, blue and white, are most important and highest in frequency of appearance.

The reading apparatus of the prior art uses, as the means for reading an original in bit units and discriminating between black, red, blue and white, a method of optically color-resolving the information of the original into three components R, G and B as by a color mosaic filter or a beam splitter and reading them by a light-receiving element such as a CCD. With such a method, however, whatever minute mosaic filter is used, the color-resolved components R, G and B are image information of different locations on the original and a reduction in the resolving power during the reading occurs. There is the further problem that the processing circuit for the signals R, G and B put out from the CCD is complex.

On the other hand, a method of color-resolving the information of an original into components R, G and B by the use of a dichroic mirror or a prism suffers from the disadvantages that it requires three CCDs, that the space required for them is large and that it requires a complex optical system.

SUMMARY OF THE INVENTION

It is an object of the present invention to provide a colored image reading apparatus which is capable of reading four colors, i.e., black, blue, red and white.

It is a further object of the present invention to provide a colored image reading apparatus which is high in resolving power and moreover simple in construction as compared with the reading apparatus of the prior art.

It is a still further object of the present invention to provide a colored image reading apparatus provided with a reading lens system which has a bright aperture ratio and high resolving power.

The colored image reading apparatus according to the present invention comprises a light source for illuminating the surface of an original, an optical system for transmitting the light beam from the surface of the original to light detecting means such as a CCD, and a color discriminating circuit for discriminating between colors by a signal detected by the light detecting means. The transmitting optical system divides the light beam from the surface of the original into a light beam of long wavelength zone and a light beam of short wavelength zone when it directs the light beam to the light detecting means, and the color discriminating circuit has a processing circuit for effecting an operation between the signals from the light detecting means and obtaining a plurality of electrical signals, and a converter circuit for converting the plurality of electrical signals into digital signals corresponding to respective colors. Representing the wavelength corresponding to the maximum value of the overall spectral characteristic curve of the light beam on the short wavelength zone side detected in a form including all of the spectral characteristics of the light source, the transmitting optical system and the light detecting means as $\lambda'b$ and the wavelength corresponding to the maximum value of the overall spectral characteristic curve of the light beam on the long wavelength zone side as $\lambda'r$, the apparatus satisfies $$540 \text{ nm} \leq (\lambda'b + \lambda'r)/2 \leq 600 \text{ nm}$$

$$\alpha \text{ nm} \leq \lambda'r - \lambda'b \infty 260 \text{ nm},$$

whereby it can read out a colored image with good accuracy. Other features of the present invention will become apparent from the following detailed description taken in conjunction with the accompanying drawings.

BRIEF DESCRIPTION OF THE DRAWINGS

FIG. 9 shows the output voltages of image signals for respective colors before analog operation.

FIG. 10 shows the output voltages of image signals for respective colors after analog operation.

FIGS. 11A, 11B, 12A, 12B, 13A, 13B, 14A, 14B, 15A, 15B, 16A, 16B, 17A, 17B, 18A, 18B, 19A, 19B, 20A, 20B, 21A and 21B are graphs showing the spectral characteristics of a further embodiment of the reading apparatus according to the present invention, FIGS. 11A, 12A, 13A, 14A, 15A, 16A, 17A, 18A, 19A, 20A and 21A showing the spectral characteristics of the beam splitter, and FIGS. 11B, 12B, 13B, 14B, 15B, 16B, 17B, 18B, 19B, 20B and 21B showing the overall spectral characteristics of the entire apparatus.

FIG. 22 is a cross-sectional view of a reading lens system applied to the apparatus according to the present invention.

FIG. 23 shows the aberrations in an embodiment of the reading lens system.

DESCRIPTION OF THE PREFERRED EMBODIMENTS

The present invention will hereinafter be described in detail with reference to the drawings.

Figure 1:
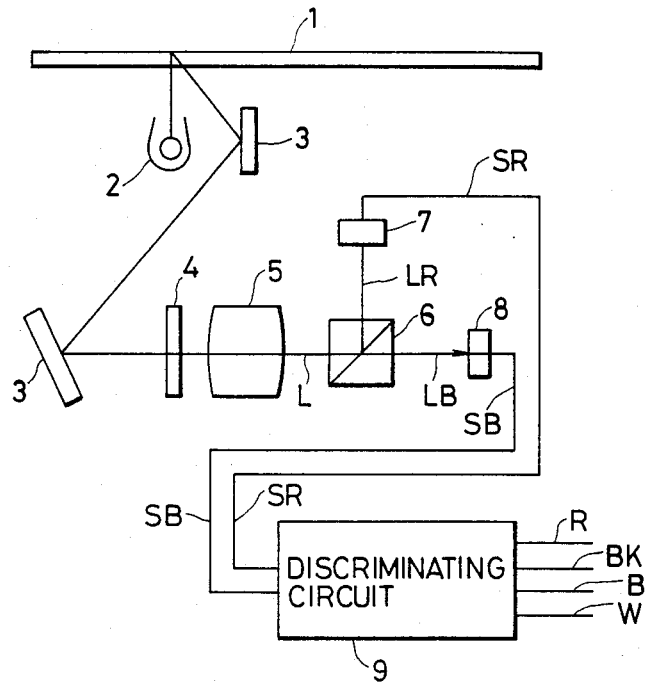
FIG. 1 schematically shows the colored image reading apparatus of the present invention.

FIG. 1 shows an embodiment of the colored image reading apparatus according to the present invention, and more particularly an apparatus for discriminating between the red, black, blue and white of an original image by the use of two CCDs.

The apparatus of FIG. 1 includes an original table 1, a halogen lamp 2, a reflecting mirror 3, an infrared ray removing filter 4, a condenser lens 5, a beam splitter 6 for reflecting a long wavelength component and transmitting a short wavelength component therethrough with the vicinity of a wavelength 580 nm as the boundary, a CCD 7 for receiving the long wavelength component, a CCD 8 for receiving the short wavelength component, and an electrical circuit 9 for discriminating between red, black, blue and white from the output signals of the two CCDs (color discriminating circuit). To facilitate the description, the CCD 7 for receiving the long wavelength component will hereinafter be referred to as the CCD (R), the output signal thereof will be referred to as SR, the CCD 8 for receiving the short wavelength component will be referred to as the CCD (B) and the output signal thereof will be referred to as SB.

As shown in FIG. 1, an original placed on the original table 1 is illuminated by the halogen lamp 2 and the reflected light L therefrom passes the reflecting mirror 3, the infrared ray removing filter 4 and the lens 5, whereafter it is resolved into a long wavelength component LR and a short wavelength component LB by the beam splitter 6. The components LR and LB are condensed and imaged on the light-receiving surfaces of the CCD (R) and CCD (B), respectively.

The output signal SR of the CCD (R) and the output signal of the CCD (B) are input to the color discriminating circuit 9, in which discrimination between red, black, blue and white is effected from the signals SR and SB and a red signal R, a black signal BK, a blue signal B and a white signal W are put out.

Figure 2:
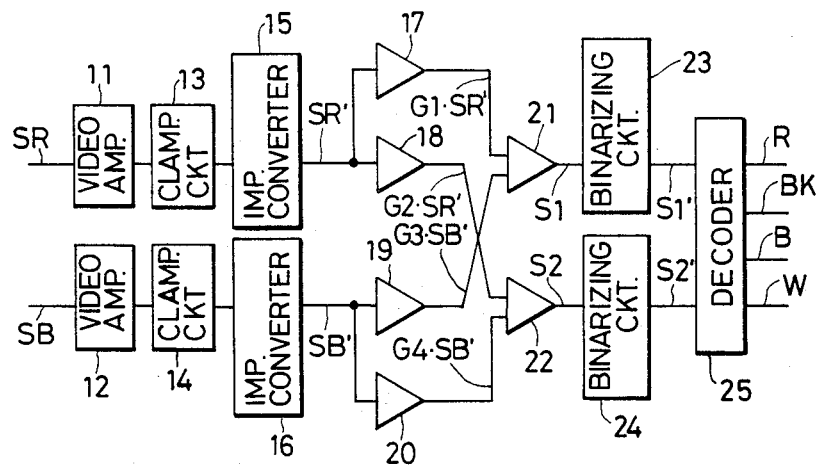
FIG. 2 shows a color discriminating circuit used in the apparatus of the present invention.

The color discriminating circuit 9 will now be described by reference to FIG. 2. FIG. 2 diagrammatically shows an embodiment of the color discriminating circuit in which subtraction is effected in analog value on the basis of the input signals SR and SB, whereafter discrimination between red, black, blue and white is effected and digital signals representative of R, BK, B and W are put out. The circuit of FIG. 2 includes video amplifiers 11, 12, clamping circuits 13, 14, impedance converters 15, 16, operational amplifiers 17, 18, 19, 20 having gains G1, G2, G3 and G4, respectively, subtractors 21, 22, binarizing circuits 23, 24, and a decoder 25.

The input signals SR and SB are amplified by the video amplifiers 11 and 12, respectively, whereafter they are clamped by the clamping circuits 13 and 14, respectively, and are input to the impedance converters 15 and 16, respectively. Assuming that the impedance-converted signals are SR' and SB', the signal SR' is amplified by the operational amplifiers 17 and 18 and put out as G1·SR' and G2·SR' and the signal SB' is amplified by the operational amplifiers 19 and 20 and put out as G3·SB' and G4·SB'. These signals G1·SR', G3·SB', G2·SR' and G4·SB' are input to the subtractors 21 and 22, in which subtractions shown in equation (1) below are effected and the signals are put out as signals S1 and S2.

$$S1 = G1 \cdot SR' - G3 \cdot SB'$$
$$S2 = G2 \cdot SR' - G4 \cdot SB' \qquad (1)$$

These signals S1 and S2 are converted by the binarizing circuits into signals S1' and S2' corresponding to High or Low and are input to the decoder 25. As shown in Table 1 below, in accordance with the signal High or Low, discrimination between R (red), BK (black), B (blue) and W (white) is effected in the decoder 25 and the discrimination signals are put out. For example, as shown in Table 1, when S1' is the High signal and S2' is the Low signal, the color is discriminated as red.

TABLE 1

|  | Red | Black | Blue | White |
|---|---|---|---|---|
| S1' | H | L | L | H |
| S2' | L | L | H | H |

It will hereinafter be described that the color signal processing circuit shown in the present invention brings a great effect to the spectral characteristic of the film vapor-deposited on the beam splitter 6, and further to the overall spectral characteristic of the entire apparatus. In a color resolving system which separates original information into three components R, G and B, close attention has been paid to the ratio of quantity of light between various wavelength zones, the wavelength in which the spectral characteristic exhibit a peak, the area of the region in which, when the spectral characteristic is graphically indicated, the spectral characteristics of adjacent wavelength zones (R and G or G and B) overlap each other, and the wavelength in which spectral characteristics intersect each other. However, where, as shown in the present invention, original information is separated into two wavelength components and received by CCDs and color discrimination reading is effected by the use of analog operation processing, the aforementioned operation constants G1–G4 are appropriately set correspondingly to the overall spectral characteristics of individual apparatus, whereby setting of the binarization reference level can be easily accomplished. This will hereinafter be described in detail by using a design example.

Figure 3:
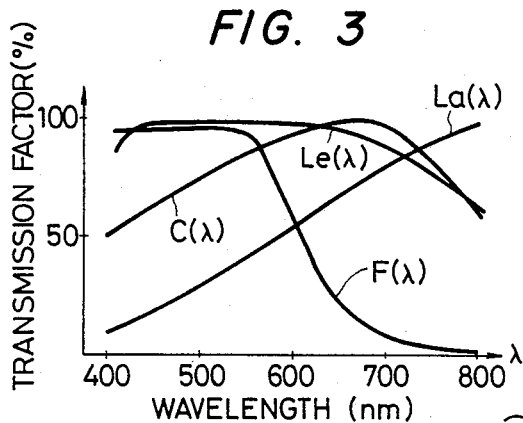
FIG. 3 is a graph showing an example of the spectral characteristic of each member constituting the apparatus of the present invention.

FIG. 3 shows an example of each of the spectral characteristic La($\lambda$) of the halogen lamp 2, the spectral transmission factor F($\lambda$) of the infrared ray removing filter 4, the spectral transmission factor Le($\lambda$) of the lens 5 for reading, and the spectral sensitivity characteristic C($\lambda$) of CCDs 107, 108. The halogen lamp 2 is, for example, at a color temperature 3060° K., and a color correcting filter (cyan), for example, is used as the infrared ray removing filter 4.

Figure 4:
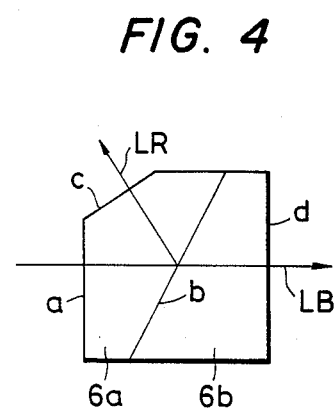
FIG. 4 shows an embodiment of the beam splitter applied to the apparatus of the present invention.
Figure 5:
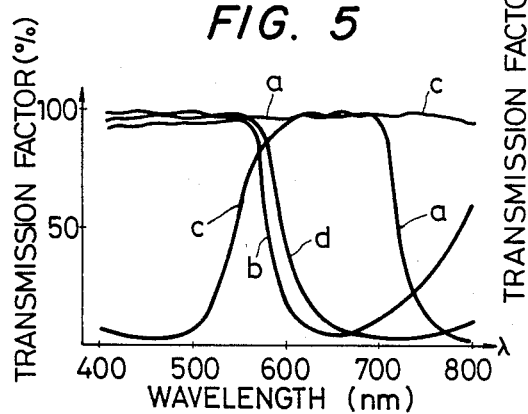
FIG. 5 is a graph showing the spectral transmission characteristics of an embodiment of each film applied to the beam splitter shown in FIG. 4.
Figure 6:
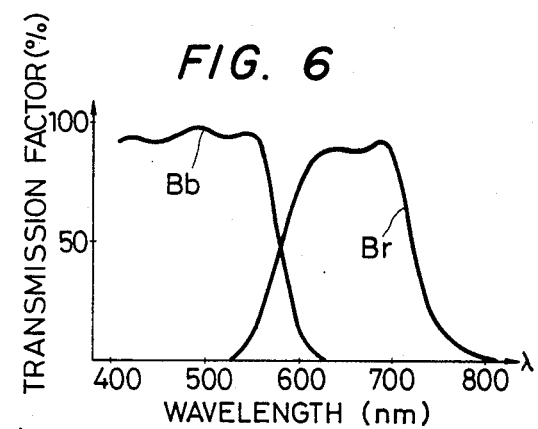
FIG. 6 is a graph showing the spectral characteristics of two light beams separated by the beam splitter shown in FIG. 4.

FIG. 4 is a cross-sectional view of an embodiment of the beam splitter 6, which comprises a first member 6A and a second member 6B cemented together. As an example of the film vapor-deposited on the beam splitter 6, an infrared ray removing film is vapor-deposited on a surface a, a film transmitting the short wavelength component therethrough and reflecting the long wavelength component with the vicinity of 580 nm as the boundary is vapor-deposited on a surface b, a film transmitting the long wavelength component therethrough (a film removing the short wavelength component) is vapor-deposited on a surface c, and a film transmitting the short wavelength component therethrough (a film removing the long wavelength component and infrared light) is vapor-deposited on a surface d. Each of the vapor-deposited films is a multilayer film comprising ten and several layers of ZrO$_2$ (refractive index 2.1) and MgF$_2$ (refractive index 1.38). FIG. 5 is a graph showing the spectral transmission factors of an embodiment of the vapor-deposited films provided on the surfaces a–d. In FIG. 5, the ordinate represents the transmission factor T(%) and the abscissa represents the wavelength λ(nm). FIG. 6 is a graph showing the overall spectral transmission characteristic of the beam splitter 6 in which the vapor-deposited films on the surface a–d have the spectral characteristics as shown in FIG. 5, and shows the spectral characteristic Br (λ) of the light beam LR (long wavelength zone characteristic) and the spectral characteristic Bb (λ) of light beam LB (short wavelength zone characteristic).

Figure 7:
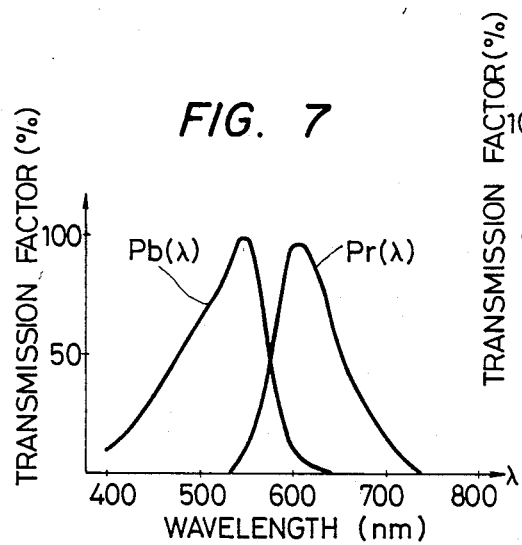
FIG. 7 is a graph showing the overall spectral characteristic of the entire reading system in a case where the spectral characteristics shown in FIGS. 3 and 6 are considered together.

FIG. 7 shows the overall spectral characteristics Pr(λ) and Pb(λ) of the entire apparatus found from the spectral characteristic of each of the constituents of the reading apparatus shown in FIG. 3 and the spectral characteristics of the beam splitter shown in FIG. 6. Pr(λ) and Pb(λ), as shown in equation (2) below, are expressed in the form of the integration of the spectral characteristics of the constituents.

$$Pr(\lambda) = La(\lambda) \cdot F(\lambda) \cdot Le(\lambda) \cdot Br(\lambda) \cdot C(\lambda)$$

$$Pb(\lambda) = La(\lambda) \cdot F(\lambda) \cdot Le(\lambda) \cdot Bb(\lambda) \cdot C(\lambda) \quad (2)$$

Figure 8:
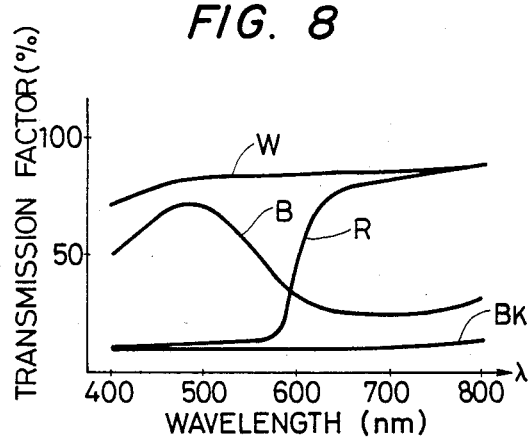
FIG. 8 is a graph showing the spectral reflection factors of respective colored originals.
Figure 15A:
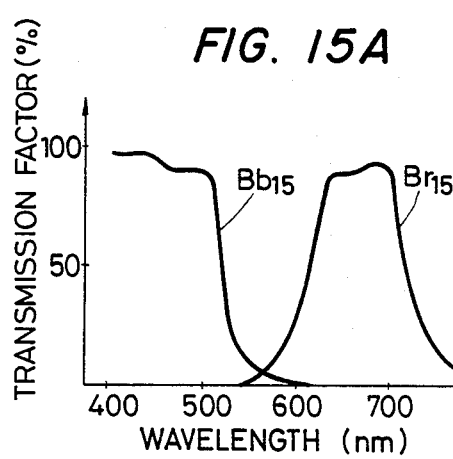
Figure 15B:
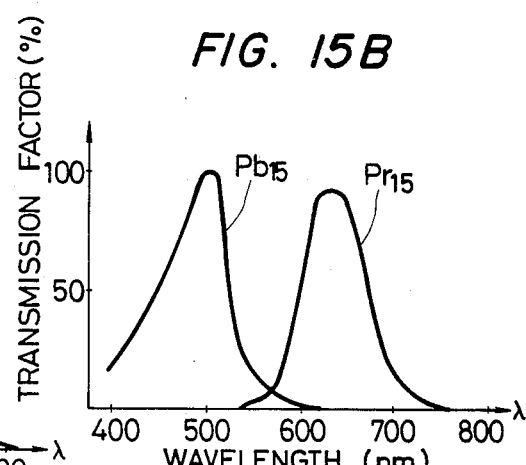
Figure 16A:
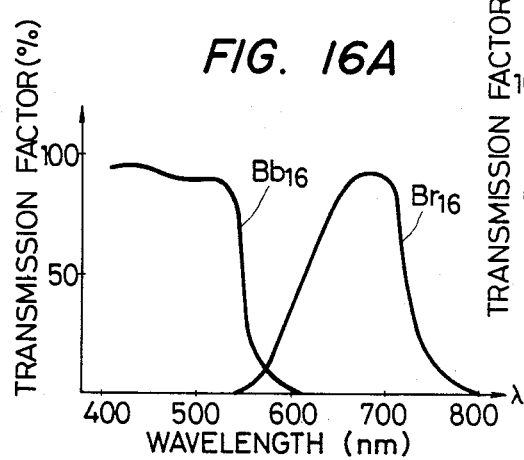
Figure 16B:
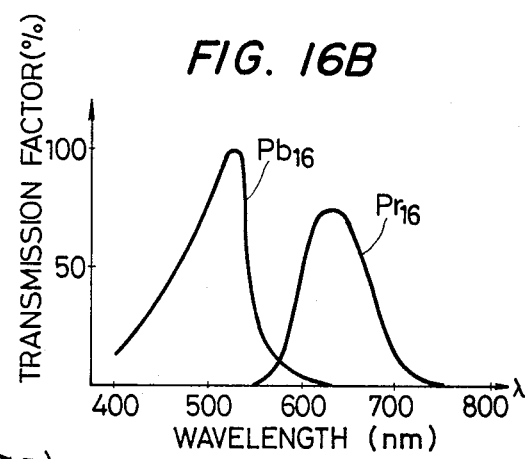
Figure 17A:
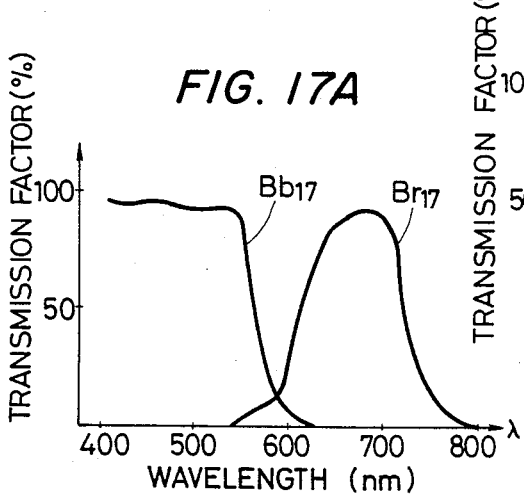
Figure 17B:
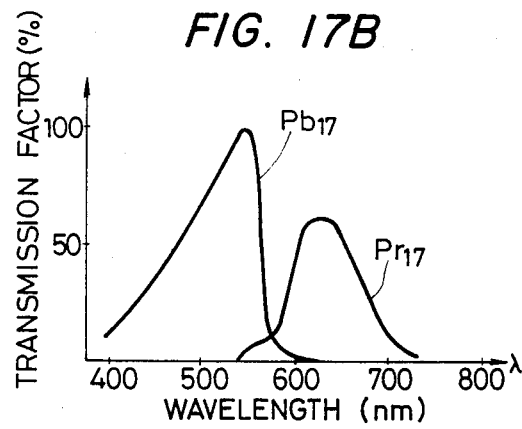
Figure 18A:
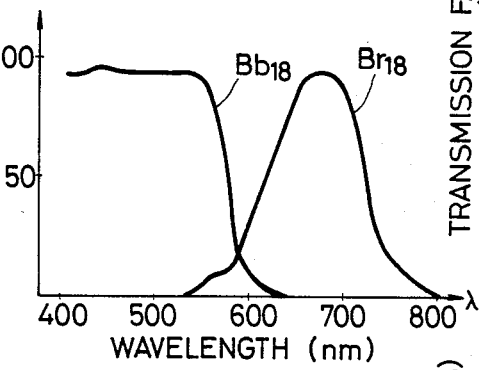
Figure 18B:
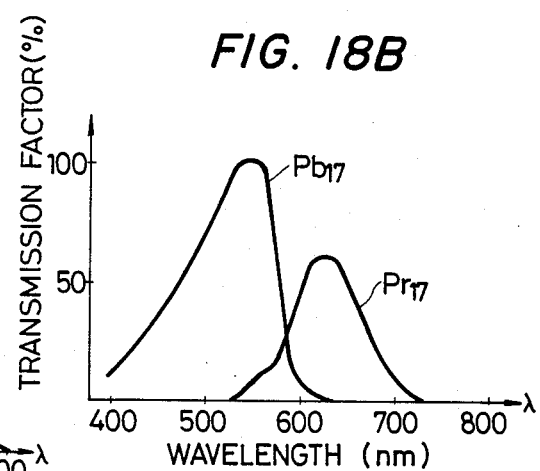
Figure 19A:
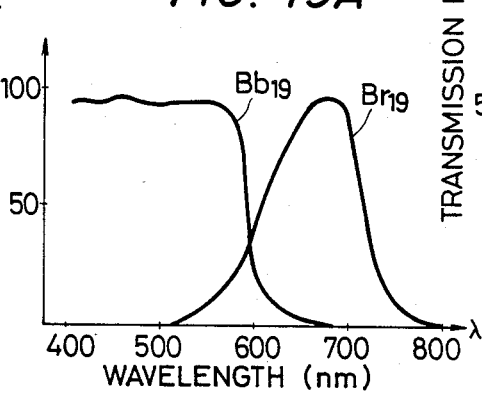
Figure 19B:
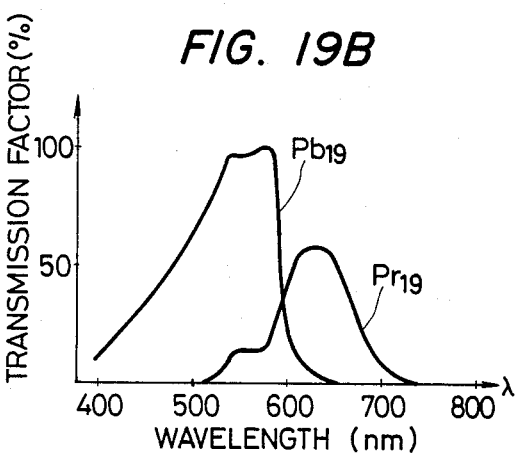
Figure 20A:
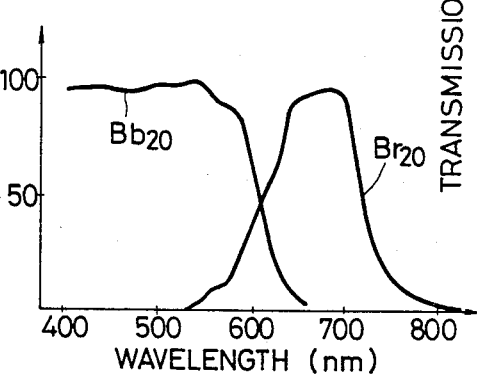
Figure 20B:
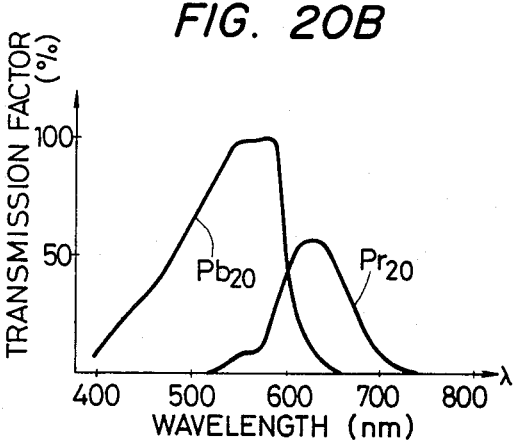

FIG. 8 shows an example of the spectral reflection characteristics $\theta i(\lambda)$ of originals of colors R (red), BK (black), B (blue) and W (white), where i=1–4 and it is the suffix corresponding to the originals of respective colors and λ represents the wavelength.

Accordingly, the impedance-converted signals SR'i and SB'i (i=1–4) from the CCDs obtained for the originals of respective colors can be found from equation (3) below.

$$SR'i = K \int \theta i(\lambda) \cdot La(\lambda) \cdot F(\lambda) \cdot Le(\lambda) \cdot Br(\lambda) \cdot C(\lambda) d\lambda$$

$$SB'i = K \int \theta i(\lambda) \cdot La(\lambda) \cdot F(\lambda) \cdot Le(\lambda) \cdot Bb(\lambda) \cdot C(\lambda) d\lambda$$

K: constant (3)

Where the elements constituting the reading apparatus have the spectral characteristics as shown in FIG. 6 and an original having the spectral reflection characteristic as shown in FIG. 8 is to be read, if equation (3) is used, the output signals from the CCDs as shown in Table 2-1 below and FIG. 9 will be obtained. FIG. 9 shows the heights of voltage of the signals SR' and SB' for the respective colors (red, black, blue and white). As is apparent from FIG. 9, in the signal SR', the output voltage is highest for white and is higher for red, blue and black in the named order, and in the signal SB', the output voltage is higher for white, blue, red and black in the named order.

TABLE 2-1

|     | Red  | Black | Blue | White |
|-----|------|-------|------|-------|
| SR' | 0.76 | 0.12  | 0.41 | 1.08  |
| SB' | 0.18 | 0.13  | 0.88 | 1.29  |

Signals S1' and S2' obtained from the numerical values of Table 2-1 by analog operation processing on the basis of equation (1) are shown in Table 2-2 below and FIG. 10, where $G1/G3 = 3.47$ and $G4/G2 = 1.63$.

TABLE 2-2

|     | Red   | Black | Blue | White |
|-----|-------|-------|------|-------|
| S1  | 2.46  | 0.29  | 0.54 | 2.46  |
| S2  | −0.47 | 0.09  | 1.02 | 1.02  |

As is apparent from FIG. 10 and Table 2-2, the signal S1 is binarized into a high output voltage (red, white) and a low output voltage (black, blue) and the signal S2 is binarized into a high output voltage (blue, white) and a low output voltage (red, black), and then they are output.

The degree of ease of binarization shown by equation (4) below will be defined to explain the effect of the color signal processing circuit using an analog operation.

The greater is this value, the easier is the setting of the binarization reference level.

$$X_R = \frac{\{SR'_W, SR_R\}\min - \{SR'_B, SR'_{BK}\}\max}{\{SR'_W, SR'_R, SR'_B, SR_{BK}\}\max} \times 100(\%) \quad (4)$$

$$X_B = \frac{\{SB'_W, SB_B\}\min - \{SB'_R, SB'_{BK}\}\max}{\{SB'_W, SB'_R, SB'_B, SB_{BK}\}\max} \times 100(\%)$$

$$X_1 = \frac{\{S1_W, S1_R\}\min - \{S1_B, S1_{BK}\}\max}{\{S1_W, S1_R, S1_B, S1_{BK}\}\max} \times 100(\%)$$

$$X_2 = \frac{\{S2_W, S2_B\}\min - \{S2_R, S2_{BK}\}\max}{\{S2_W, S2_R, S2_B, S2_{BK}\}\max} \times 100(\%)$$

where "{,} min(max)" represent the minimum(maximum) value of the numerical values in { }.

The degree of ease of binarization obtained by substituting the values shown in tables 2-1 and 2-2 into equation (4) is shown in Table 3. It is apparent that the degree of ease of binarization is improved by the color signal processing circuit shown in the present invention.

TABLE 3

| $X_R$ | $X_B$ | $X_1$ | $X_2$ |
|-------|-------|-------|-------|
| 32%   | 54%   | 78%   | 91%   |

The invention will hereinafter be described in detail by using a further embodiment thereof. Eleven examples of the spectral characteristics Brj(λ) and Bbj(λ) of the aforementioned vapor-deposited films used in the beam splitter 6 are shown in FIGS. 11A–21A. j=11–21 and is an index corresponding to FIGS. 11–21, r is a subscript representing the long wavelength zone, and b is a subscript representing the short wavelength zone. Further, by using the spectral characteristics La(λ), F(λ), Le(λ) and C(λ) of the constituents of the reading apparatus shown in FIG. 3 and Brj(λ) and Bbj(λ) shown in FIGS. 11A–21A, the overall spectral characteristics Prj(λ) and Pbj(λ) of the entire apparatus are shown in FIGS. 11B–21B, where the maximum values of the numerical values of Prj(λ) and Pbj(λ) are represented by relative values standardized into 100(%).

$$Prj(\lambda) = La(\lambda) \cdot F(\lambda) \cdot Le(\lambda) \cdot Brj(\lambda) \cdot C(\lambda) \quad (2)'$$

$$Pbj(\lambda) = La(\lambda) \cdot F(\lambda) \cdot Le(\lambda) \cdot Bbj(\lambda) \cdot C(\lambda)$$

The values of signals SR' and SB' before the analog operation in a case where red, black, blue and white originals having the spectral reflection characteristics shown in FIG. 8 are read by eleven types of apparatus in which the overall spectral characteristics shown in FIGS. 11–21 differ from one another are shown in Table 4 below.

The values of signals S1 and S2 obtained in each apparatus by analog operation being effected with optimal operation constants G1, G2, G3 and G4 set and the values of the then operation constant ratios $\xi_o = G1/G3$ and $\eta_o = G4/G2$ are shown in Table 5 below.

The degrees of ease of binarization $X_R$, $X_B$, X1 and X2 defined by equation (4) calculated by using the numerical values shown in Tables 4 and 5 are shown in Table 6 below.

It is seen that the degrees of ease of binarization are improved by carrying out the color signal processing shown in the present invention.

TABLE 4

|  |  | Red | Black | Blue | White |
|---|---|---|---|---|---|
| No. 11 | SR' | 0.19 | 0.02 | 0.08 | 0.20 |
|  | SB' | 0.04 | 0.02 | 0.12 | 0.18 |
| No. 12 | SR' | 0.30 | 0.04 | 0.12 | 0.31 |
|  | SB' | 0.04 | 0.02 | 0.19 | 0.24 |
| No. 13 | SR' | 0.41 | 0.05 | 0.16 | 0.43 |
|  | SB' | 0.04 | 0.03 | 0.28 | 0.35 |
| No. 14 | SR' | 0.50 | 0.06 | 0.20 | 0.54 |
|  | SB' | 0.06 | 0.05 | 0.40 | 0.49 |
| No. 15 | SR' | 0.56 | 0.07 | 0.23 | 0.63 |
|  | SB' | 0.09 | 0.06 | 0.54 | 0.67 |
| No. 16 | SR' | 0.58 | 0.07 | 0.25 | 0.67 |
|  | SB' | 0.12 | 0.09 | 0.68 | 0.89 |
| No. 17 | SR' | 0.58 | 0.08 | 0.26 | 0.69 |
|  | SB' | 0.15 | 0.11 | 0.82 | 1.13 |
| No. 18 | SR' | 0.58 | 0.08 | 0.27 | 0.70 |
|  | SB' | 0.19 | 0.13 | 0.93 | 1.37 |
| No. 19 | SR' | 0.58 | 0.08 | 0.27 | 0.70 |
|  | SB' | 0.25 | 0.16 | 1.02 | 1.59 |
| No. 20 | SR' | 0.59 | 0.08 | 0.27 | 0.71 |
|  | SB' | 0.34 | 0.17 | 1.07 | 1.73 |
| No. 21 | SR' | 0.59 | 0.08 | 0.28 | 0.72 |
|  | SB' | 0.40 | 0.18 | 1.10 | 1.80 |

TABLE 5

|  |  | Red | Black | Blue | White | $\xi_0$ | $\eta_0$ |
|---|---|---|---|---|---|---|---|
| No. 11 | S1 | 2.62 | 0.26 | 1.0 | 2.62 | 14.0 | — |
|  | S2 | −0.11 | 0.02 | 0.16 | 0.16 | — | 2.0 |
| No. 12 | S1 | 5.96 | 0.78 | 2.21 | 5.96 | 20.0 | — |
|  | S2 | −0.15 | 0.04 | 0.60 | 0.60 | — | 3.8 |
| No. 13 | S1 | 6.32 | 0.75 | 2.20 | 6.32 | 15.5 | — |
|  | S2 | −0.26 | 0.07 | 0.92 | 0.92 | — | 3.9 |
| No. 14 | S1 | 5.32 | 0.60 | 1.75 | 5.32 | 10.75 | — |
|  | S2 | −0.27 | 0.13 | 1.31 | 1.31 | — | 3.8 |
| No. 15 | S1 | 4.55 | 0.52 | 1.37 | 4.55 | 8.3 | — |
|  | S2 | −0.28 | 0.11 | 1.43 | 1.43 | — | 3.1 |
| No. 16 | S1 | 4.84 | 0.51 | 1.46 | 4.84 | 8.6 | — |
|  | S2 | −0.34 | 0.11 | 1.11 | 1.11 | — | 2.0 |
| No. 17 | S1 | 5.02 | 0.60 | 1.50 | 5.02 | 8.9 | — |
|  | S2 | −0.37 | 0.07 | 0.88 | 0.88 | — | 1.4 |
| No. 18 | S1 | 5.51 | 0.66 | 1.64 | 5.51 | 9.8 | — |
|  | S2 | −0.39 | 0.05 | 0.64 | 0.64 | — | 0.98 |
| No. 19 | S1 | 6.23 | 0.73 | 1.99 | 6.23 | 11.2 | — |
|  | S2 | −0.39 | 0.05 | 0.50 | 0.50 | — | 0.75 |
| No. 20 | S1 | 6.49 | 0.76 | 2.06 | 6.49 | 11.6 | — |
|  | S2 | −0.36 | 0.03 | 0.44 | 0.44 | — | 0.67 |
| No. 21 | S1 | 5.95 | 0.68 | 1.92 | 5.95 | 10.8 | — |
|  | S2 | −0.34 | 0.03 | 0.41 | 0.41 | — | 0.63 |

TABLE 6

|  | $X_R$ (%) | $X_B$ (%) | $X_1$ (%) | $X_2$ (%) |
|---|---|---|---|---|
| No. 11 | 55 | 44 | 62 | 88 |
| No. 12 | 58 | 63 | 63 | 93 |
| No. 13 | 58 | 69 | 65 | 92 |
| No. 14 | 56 | 69 | 67 | 90 |
| No. 15 | 52 | 67 | 70 | 92 |
| No. 16 | 49 | 63 | 70 | 90 |
| No. 17 | 46 | 59 | 70 | 92 |
| No. 18 | 44 | 54 | 70 | 92 |
| No. 19 | 44 | 48 | 68 | 90 |
| No. 20 | 45 | 42 | 68 | 93 |
| No. 21 | 43 | 39 | 68 | 93 |

The data of each embodiment of the overall spectral characteristics shown in FIGS. 11–21 are shown in Table 7 below. Table 7 also shows the overall spectral characteristic curve shown in FIG. 7 as j=7.

In the overall spectral characteristic curves $Prj(\lambda)$ and $Pbj(\lambda)$ shown in FIGS. 7 and 11B–21B, the wavelengths providing maximum values are shown in the columns of $\lambda'r$ and $\lambda'b$. The average value $(\lambda'r + \lambda'b)/2$ of the wavelengths $\lambda'r$ and $\lambda'b$ is shown in the column of $\lambda'ave$. The differences between $\lambda'ave$ and $\lambda'r$, $\lambda'b$ are shown in the column of $\lambda'pp$. Also, the values of $Pr(\lambda'r)$ and $Pb(\lambda'b)$ are represented by Pr' and Pb', respectively, and the ratio $Pr(C)/P'r$ to the value $Pr(C)$ for bright line spectrum C line (656 nm) and the ratio $Pb(F)/P'b$ for bright line spectrum F line (486 nm) are shown. Further, the areas of the regions which the overall spectral characteristic curves $Prj(\lambda)$ and $Pbj(\lambda)$ surround with the horizontal axis in a predetermined wavelength range are represented by Qrj and Qbj, and the ratio Qbj/Qrj thereof is shown.

$$Qrj = \int Prj(\lambda)d\lambda$$

$$Qbj = \int Pb(\lambda)d\lambda \qquad (5)$$

Further, the area of the region in which $Prj(\lambda)$ and $Pbj(\lambda)$ overlap each other is represented by Qcj and the ratio Qcj/Qrj of Qcj to Qrj is shown.

TABLE 7

| No. (j) | $\lambda'r$ (nm) | $\lambda'b$ (nm) | $\lambda'ave$ (nm) | $\lambda'pp$ (nm) | $\frac{Pr(C)}{Pr'}$ | $\frac{Pb(F)}{Pb'}$ | $\frac{Qb}{Qr}$ | $\frac{Qc}{Qr}$ |
|---|---|---|---|---|---|---|---|---|
| 11 | 680 | 420 | 550 | ±130 | 0.87 | 0.18 | 0.97 | 0.18 |
| 12 | 660 | 440 | 550 | ±110 | 0.98 | 0.24 | 0.86 | 0.09 |
| 13 | 640 | 460 | 550 | ±90 | 0.92 | 0.60 | 0.86 | 0.05 |
| 14 | 640 | 480 | 560 | ±80 | 0.74 | 0.98 | 0.95 | 0.04 |
| 15 | 640 | 500 | 570 | ±70 | 0.70 | 0.79 | 1.12 | 0.05 |
| 16 | 620 | 520 | 570 | ±50 | 0.70 | 0.66 | 1.38 | 0.07 |
| 17 | 620 | 540 | 580 | ±40 | 0.72 | 0.53 | 1.71 | 0.12 |
| 18 | 640 | 540 | 590 | ±50 | 0.72 | 0.54 | 2.04 | 0.11 |
| 19 | 640 | 540 | 590 | ±50 | 0.72 | 0.52 | 2.34 | 0.25 |
| 20 | 640 | 540 | 590 | ±50 | 0.72 | 0.52 | 2.52 | 0.34 |
| 21 | 640 | 540 | 590 | ±50 | 0.72 | 0.52 | 2.60 | 0.42 |
| 7 | 600 | 540 | 570 | ±30 | 0.43 | 0.55 | 1.22 | 0.19 |

In the reading apparatus presented by the present invention, information is separated into two long and short wavelength zones. However, if the standard of the long wavelength zone is sought after in the bright line spectrum C line (656 nm) and the standard of the short wavelength zone is sought after in the bright line spectrum F line (486 nm), it will be appropriate to set the separation zone of the two wavelength zones to $$540 \leq \lambda'ave \leq 600 \text{ (nm)} \qquad (6)$$

as shown in the column of $\lambda'ave$ of Table 7.

If the lower limit of the condition of the foregoing formula (6) is exceeded, the types of blue originals to be read will be remarkably limited. If the upper limit of the formula (6) is exceeded, the types of red originals to be read will be remarkably limited. Further, if the foregoing condition is departed from, the color balance of the image read will remarkably differ from the color tone of the original image.

The wavelengths $\lambda'r$ and $\lambda'b$ providing the maximum value of the spectral characteristic in the respective wavelength zones under the condition of formula (6) should preferably be set to the range of $$60 \leq \lambda r' - \lambda b' \leq 260 \text{ (nm)} \tag{7}$$

The fact that this value exceeds the upper limit means that $\lambda'r$ is set to the mear infrared range and $\lambda'b$ is set to the near ultraviolet range. However, the apparatus provided by the present invention is to read visible light information and therefore, any reduction in quantity of light of the visible range in which the information is included is undesirable. On the other hand, if the lower limit of formula (7) is exceeded, more components will be commonly included in the signal outputs of the long and short wavelength zones and perform the noise function of the color information component, and this is not preferable.

In order that the original information may be read accurately, the output signal from the CCD by color signal information must be able to be sufficiently distinguished from the dark current signal of the CCD.

To increase the quantity of light incident on the CCD, there are such expedients as increasing the brightness of the illuminating light source or increasing the aperture of the reading lens, but there is a limit to such methods.

Accordingly, as the conditions concerning the color signal output from the CCD, it is necessary to set the standard of the long wavelength zone to C line and the standard of the short wavelength zone to F line and to set the following ranges in addition to the conditions of the foregoing formulas (6) and (7):

$$0.18 \leq \frac{Pb(F)}{Pb'} \leq 1.0 \tag{8}$$

$$0.4 \leq \frac{Pr(C)}{Pr'} \leq 1.0$$

If the lower limits of the above conditions are exceeded, it will be difficult to obtain a color information signal which can be sufficiently distinguished from the dark current signal.

In addition to the foregoing conditions (6), (7) and (8), the following condition is set up:

$$0.8 \leq \frac{Qb}{Qr} \leq 2.7 \tag{9}$$

In the construction of the apparatus, it is desirable that two CCDs and the electrical system for each CCD can be designed with a common specification.

However, if the limits of the above condition are departed from, in a case where, for example, a white original is to be read, the quantities of light reaching the two CCDs will greatly differ from each other and there will arise the necessity of individually designing and manufacturing the electronic elements and circuits in the long and short wavelength zones, and this is not preferable.

The value of Qc/Qr shows the rate of the noise light owned jointly by the long and short wavelength zone signals occupied in the long wavelength zone signal. In addition to the foregoing conditions (6), (7), (8) and (9), the following condition is desirable:

$$0 \leq \frac{Qc}{Qr} \leq 0.5 \tag{10}$$

If the limits of the above condition (10) are departed from, the degrees of ease of binarization X1 and X2 will greatly vary for slight fluctuations of operation constant ratios $\xi$ and $\eta$ during the setting of the analog operation constant and severity will be required of adjustment, and this is not preferable. Also, they become liable to be affected by an extraneous output fluctuation factor such as the electrical noise during operation, and this is not preferable. Describing this by using some examples of the numerical values, the values of $\xi_o(=G1/G3)$ and $\eta_o(=G4/G2)$ providing X1 and X2 shown in Tables 3 and 6 are varied by 20%. That is, $\xi'$ and $\eta'$ are set to $\xi'=1.2\xi_o$ and $\eta'=1.2\eta_o$. The degrees of ease of binarization X1' and X2' then obtained and the rates of fluctuation X1'/X1 and X2'/X2 from X1 and X2 will be shown in Table 8 below. As is apparent from Tables 7 and 8, as the value of Qc/Qr approaches the upper limit of formula (10), the rate at which the degree of ease of binarization fluctuates becomes greater. Still, however, high values are exhibited for the degrees of ease of binarization $X_R'$ and $X_B'$ when no color signal processing is carried out.

TABLE 8

| No. (j) | X1' (%) | X'1'/X1 | X2' (%) | X2'/X2 |
|---|---|---|---|---|
| 11 | 61 | 0.98 | 78 | 0.89 |
| 12 | 62 | 0.98 | 89 | 0.96 |
| 13 | 64 | 0.98 | 88 | 0.96 |
| 14 | 65 | 0.97 | 86 | 0.96 |
| 15 | 67 | 0.96 | 87 | 0.95 |
| 16 | 66 | 0.94 | 84 | 0.93 |
| 17 | 66 | 0.94 | 84 | 0.91 |
| 18 | 64 | 0.91 | 82 | 0.89 |
| 19 | 63 | 0.93 | 80 | 0.89 |
| 20 | 64 | 0.94 | 78 | 0.84 |
| 21 | 63 | 0.93 | 77 | 0.83 |
| 7 | 67 | 0.86 | 82 | 0.88 |

As described above, in the reading apparatus according to the present invention, it is possible to bring great degrees of freedom to the spectral characteristics of the vapor-deposited films of the beam splitter 6 and the overall spectral characteristic of the entire apparatus and further, the setting of the binarization reference level is easy and less susceptible to the influence of the output fluctuation factor such as electrical noise.

Further, the present invention will have a greater effect as a color discriminating method if it employs a lens of great aperture ratio as the reading lens. That is, by using a reading lens of great aperture ratio, the present invention can alleviate the regulation of the absolute value of the reflection factor or the transmission factor of the color resolving system and this facilitates the manufacture of the color resolving system. In fact, ten or more layers of the thin interference film forming the color resolving system are required and thus, a plurality of such multilayer films are used and the reflection characteristic or the transmission characteristic is varied by manufacturing error and, if a reading lens of small aperture ratio is employed, the S/N of the color signal will be reduced. By employing a reading lens of great aperture ratio, the present invention prevents occurrence of such inconveniences.

Description will now be made of the construction of the reading lens system 5 and of the beam splitter 6.

As shown in the above-described embodiment, the reading apparatus according to the present invention separates the light beam from the original into two wavelength components by the beam splitter 6 and images them on the light-receiving CCDs 7 and 8. Accordingly, the reading lens 5 is required to be of a great aperture and attention must be paid to the correction of spherical aberration. Also, it is desired that there be no eclipse over the entire angle of view.

FIG. 22 shows an embodiment of the reading lens system used in the reading apparatus of the present invention. The lens system 5 comprises, in succession from the object side to the image side, a first positive meniscus lens 31 having its convex surface facing the object side, a second meniscus lens consisting of a second-first positive lens 32 and a second-second negative lens 33 cemented together and having its convex surface facing the object side, a third meniscus lens consisting of a third-first negative lens 34 and a third-second positive lens 35 cemented together and having its convex surface facing the image side, a fourth positive lens 36 and a fifth positive lens 37. ri represents the radius of curvature of the ith surface from the object side, and di represents the on-axis thickness or the on-axis air space between the ith surface and the i+1th surface. Reference numeral 6 designates the beam splitter. $r_{13}$ and $r_{14}$ designate the entrance end surface and the exit end surface, respectively, of the beam splitter, $d_{12}$ denotes the spacing between the lens system 5 and the beam splitter 6, and $d_{13}$ represents the on-axis thickness of the beam splitter. ni represents the refractive index of the ith lens from the object side.

It is necessary that the full length D of the lens system of the present invention (the sum of $d_1$ to $d_{11}$) satisfy the following condition relative to the focal length f of the lens system;

$$0.9 < D/f < 1.3 \tag{11}$$

In order that the reading lens system may be a bright lens, it is necessary that the F-number on the axis be small and that there be no eclipse off the axis, that is, that the aperture efficiency be 100%. If the lower limit of condition (11) is exceeded, the curvature of each surface will become sharper and it will become impossible to eliminate the occurrence of spherical aberration which is an aberration on the axis and flare around the picture plane which is an aberration off the axis. If the value of D/f becomes greater, the lens system will become brighter, but if the upper limit of condition (11) is exceeded, the incidence height of the off-axis ray on each surface will become greater, thus aggravating distortion and astigmatism which are off-axis aberrations. As is well known, a parallel flat glass disposed between a lens and the image plane thereof has the function of correcting astigmatism to the positive and therefore, if condition (11) is satisfied, both spherical aberration and astigmatism can be well corrected even if the lens is bright as the reading lens system and the aperture efficiency is made high.

In order that the above-described lens system may further have a high resolving power and distortion may be well corrected, it is desirable that the Gauss type lens satisfy the following conditions. If the lens surfaces of the reading lens system of FIG. 22 are designated, as the first surface to the twelfth surface in succession from the object side, the lens system is divided into the following three part systems:

First part system: a part system constituted by the first surface to the third surface Second part system: a part system constituted by the fourth surface to the seventh surface Third part system: a part system constituted by the eighth surface to the twelfth surface This lens system can basically be considered to have the power arrangement of a positive-negative-positive triplet. If fi: the focal length of each part system $e_1$: the spacing between the principal points of the first and second part systems $e_2$: the spacing between the principal points of the second and third part systems, then the power arrangements of these three part systems can be represented by the following four parameters:

$$k = e_1/f_1 - e_2/f_2 \tag{12'}$$

$$\Sigma_\phi = (1/f_1 + 1/f_2 + 1/f_3) \times f \tag{13'}$$

$$L = e_1 + e_2 \tag{14'}$$

$$\epsilon = e_2/e_1 \tag{15'}$$

The power arrangements $f_1$, $f_2$, $f_3$, $e_1$ and $e_2$ of the three part systems are determined by these four parameters and the focal length f of the entire system.

Here, k is a parameter associated with distortion and, if the absolute value of k is great, correction of distortion will become difficult. For example, if k becomes greater in the positive sense, the incidence height to the first part system will become greater and positive distortion will occur. $\Sigma_\phi$ is a parameter concerning the Petzval sum and usually assumes a negative value and, as $|\Sigma_\phi|$ becomes greater, the Petzval sum of the entire system becomes smaller and curvature of the image field becomes better. L is a parameter concerning the full length of the lens and, as L is greater, the power of each part system becomes looser and spherical aberration becomes better. $\epsilon$ is the ratio of the spacing between the first and the second part system to the spacing between the second and the third part system and, if $\epsilon$ deviates greatly from 1, it will provide an unbalanced power arrangement before and after the stop and will adversely affect coma, etc. It is desirable that the power arrangement of the Gauss type lens applied to the present invention be as follows:

$$-0.21 < k < -0.09 \tag{12}$$

$$-2.0 < \Sigma_\phi < -1.5 \tag{13}$$

$$0.48 < L < 0.61 \tag{14}$$

$$0.8 < \epsilon < 1.1 \tag{15}$$

If k in formula (12) exceeds the lower limit, the incidence height of the off-axis ray to the third part system will become great as compared with that to the first part system and the power of the third part system will become strong and therefore, negative distortion will occur remarkably. If the upper limit of formula (12) is exceeded, the power of the first part system will become strong and correction of spherical aberration will be difficult. If $\Sigma_{100}$ in formula (13) exceeds the upper limit, the Petzval sum will become great and curvature of the image field will be aggravated. Also, if L exceeds the lower limit of formula (14), spherical aberration will be aggravated. If $\epsilon$ in formula (15) exceeds the lower limit, there will be provided an unbalanced power arrangement and correction of coma will become difficult. If $\epsilon$ exceeds the upper limit, under the condition of formula (12), the power of the first part system constituted by three surfaces will become strong, but it is advantageous for the correction of spherical aberration, etc., to make strong the power of the third part system constituted by five surfaces because it can equalize the powers of the respective surfaces. If $\Sigma_\phi$ exceeds the lower limit of formula (13) and L exceeds the upper limit of formula (14), it will be advantageous for correction of both spherical abberation and curvature of image field, but the simultaneous equations for $f_1$, $f_2$, $f_3$, $e_1$ and $e_2$ comprising formulas (12'), (13'), (14') and (15') and the focal length f of the entire system are a cubic equation and, under the conditions of formulas (12) and (15), there is no solution which has a positive-negative-positive power arrangement.

If the following conditions are satisfied, still better correction of aberrations will be possible.

$$0.6 < r_1/f < 1.0 \tag{16}$$

$$3.5 < r_2/r_1 < 6.0 \tag{17}$$

$$2.5 < d_5/f < 3.5 \tag{18}$$

$$0.6 < -r_{10}/f < 1.0 \tag{19}$$

If the lower limit of condition (16) is exceeded, the curvature of the first surface will become sharper and spherical aberration will be aggravated. If the upper limit of condition (16) is exceeded, the curvature of the third surface will become sharper and spherical aberration and coma will be aggravated under the power arrangement which satisfies the conditions of formulas (12)-(15). If the lower limit of condition (17) is exceeded, correction of distortion will become difficult and, if the upper limit of condition (17) is exceeded, high order astigmatism will occur in the negative sense and this is not preferable. If the lower limit of condition (18) is exceeded, the curvatures of the fifth and sixth surfaces will become too sharp to satisfy the power of the second part system determined by formulas (12)-(15) and spherical aberration will be over-corrected. Also, both of the angle of incidence of the off-axis upper ray onto the fifth surface and the angle of incidence of the off-axis lower ray onto the sixth surface will become sharper and the occurrence of flare around the picture plane will become remarkable.

In this reading lens system, the occurrence of spherical aberration in the first and third part systems can be minimized by conditions (11), (14) and (16). Therefore, the burden of the spherical aberration correction in the fifth and sixth surfaces can be reduced. As a result, it is possible to reduce the amount of refraction of the off-axis upper ray in the fifth surface and the amount of refraction of the off-axis lower ray in the sixth surface and to eliminate the occurrence of flare around the picture plane and coma.

If the upper limit of condition (18) is exceeded, the curvatures of the fifth and sixth surfaces will become less sharp and Petzval sum will be aggravated and astigmatism will be under-corrected. If the lower limit of condition (19) is exceeded, spherical aberration will be aggravated and, if the upper limit of condition (19) is exceeded, astigmatism and coma will occur.

Also, it is desirable that the thickness $d_{13}$ of the beam splitter (parallel flat glass) 6 be $$0 < d_{13} < 0.7 Sk' \tag{20}$$

relative to the back focal length Sk' of the reading lens 5. If the upper limit of formula (20) is exceeded, it will become very difficult to adjust the position of the light-receiving element disposed on the image plane. Also, if $d_{13}=0$, the effect of astigmatism correction will not be obtained.

The lens data of the reading lens system will be shown in Tables 9-14 below. In the tables below, t' represents the distance from the fifth surface to the stop, $n_1-n_7$ and $\nu_1-\nu_7$ represent the refractive indices for d-line and Abbe numbers, respectively, of the successive lenses, $n_8$ and $\nu_8$ represent the refractive index for d-line and Abbe number, respectively, of the beam splitter 6. In each of the tables, there are also shown the focal length f corresponding to the lens data, lateral magnification $\beta$, F-number F, half angles of view $\omega$, k, $\Sigma_\phi$, L, $\epsilon$, full length D of the lens, and the allotted value $III_2$ of the second surface for the fifth order astigmatism coefficient when the focal length is 1.

TABLE 9

| Radius of curvature | | Intersurface spacing | | Refractive index (Nd) | | Abbe number ($\nu$d) | |
|---|---|---|---|---|---|---|---|
| $r_1$ | 68.003 | $d_1$ | 9.66 | $n_1$ | 1.69680 | $\nu_1$ | 55.5 |
| $r_2$ | 245.74 | $d_2$ | 0.16 | | | | |
| $r_3$ | 42.874 | $d_3$ | 13.21 | $n_2$ | 1.71300 | $\nu_2$ | 53.8 |
| $r_4$ | 295.68 | $d_4$ | 7.49 | $n_3$ | 1.62588 | $\nu_3$ | 35.7 |
| $r_5$ | 25.101 | $d_5$ | 27.91 | | | | |
| $r_6$ | −29.239 | $d_6$ | 6.48 | $n_4$ | 1.69895 | $\nu_4$ | 30.1 |
| $r_7$ | 930.09 | $d_7$ | 12.28 | $n_5$ | 1.72000 | $\nu_5$ | 50.2 |
| $r_8$ | −47.933 | $d_8$ | 1.08 | | | | |
| $r_9$ | 833.26 | $d_9$ | 7.03 | $n_6$ | 1.71300 | $\nu_6$ | 53.8 |
| $r_{10}$ | −83.315 | $d_{10}$ | 0.77 | | | | |
| $r_{11}$ | −1930.3 | $d_{11}$ | 5.64 | $n_7$ | 1.69680 | $\nu_7$ | 55.5 |
| $r_{12}$ | −147.95 | $d_{12}$ | 25.79 | | | | |
| $r_{13}$ | ∞ | $d_{13}$ | 37.84 | $n_8$ | 1.51633 | $\nu_8$ | 64.1 |
| $r_{14}$ | ∞ | t' | 14.32 | | | | |
| f | 100 | $\beta$ | −0.12 | F | 1.8 | $\omega$ | 12.6° |
| k | −0.098 | L | 0.497 | $\Sigma_\phi$ | −1.55 | $\epsilon$ | 0.996 |
| D | 91.72 | $III_2$ | 1.502 | | | | |

TABLE 10

| Radius of curvature | | Intersurface spacing | | Refractive index (Nd) | | Abbe number ($\nu$d) | |
|---|---|---|---|---|---|---|---|
| $r_1$ | 98.320 | $d_1$ | 22.17 | $n_1$ | 1.69350 | $\nu_1$ | 53.2 |
| $r_2$ | 555.26 | $d_2$ | 0.13 | | | | |
| $r_3$ | 46.067 | $d_3$ | 21.33 | $n_2$ | 1.69350 | $\nu_2$ | 53.2 |
| $r_4$ | 643.30 | $d_4$ | 4.17 | $n_3$ | 1.62364 | $\nu_3$ | 36.5 |
| $r_5$ | 26.048 | $d_5$ | 32.45 | | | | |
| $r_6$ | −28.681 | $d_6$ | 5.83 | $n_4$ | 1.69895 | $\nu_4$ | 30.1 |
| $r_7$ | 127.04 | $d_7$ | 15.92 | $n_5$ | 1.69350 | $\nu_5$ | 53.2 |
| $r_8$ | −47.433 | $d_8$ | 0.2 | | | | |
| $r_9$ | −449.49 | $d_9$ | 9.17 | $n_6$ | 1.69350 | $\nu_6$ | 53.2 |
| $r_{10}$ | −65.928 | $d_{10}$ | 0.17 | | | | |
| $r_{11}$ | 144.747 | $d_{11}$ | 9.17 | $n_7$ | 1.69350 | $\nu_7$ | 50.3 |
| $r_{12}$ | −285.68 | $d_{12}$ | 26.35 | | | | |
| $r_{13}$ | ∞ | $d_{13}$ | 38.67 | $n_8$ | 1.51633 | $\nu_8$ | 64.1 |
| $r_{14}$ | ∞ | t' | 19.52 | | | | |
| f | 100 | $\beta$ | −0.12 | F | 1.8 | $\omega$ | 12.6° |

TABLE 10-continued

| Radius of curvature | | Intersurface spacing | | Refractive index (Nd) | | Abbe number (νd) | |
|---|---|---|---|---|---|---|---|
| k | −0.204 | L | 0.60 | $\overline{\Sigma}_\phi$ | −1.85 | ε | 0.893 |
| D | 120.72 | III$_2$ | 2.376 | | | | |

TABLE 11

| Radius of curvature | | Intersurface spacing | | Refractive index (Nd) | | Abbe number (νd) | |
|---|---|---|---|---|---|---|---|
| r$_1$ | 68.260 | d$_1$ | 9.78 | n$_1$ | 1.69680 | ν$_1$ | 55.5 |
| r$_2$ | 247.44 | d$_2$ | 0.23 | | | | |
| r$_3$ | 43.206 | d$_3$ | 13.07 | n$_2$ | 1.71300 | ν$_2$ | 53.8 |
| r$_4$ | 294.37 | d$_4$ | 7.47 | n$_3$ | 1.62588 | ν$_3$ | 35.7 |
| r$_5$ | 25.479 | d$_5$ | 28.48 | | | | |
| r$_6$ | −29.164 | d$_6$ | 6.55 | n$_4$ | 1.68893 | ν$_4$ | 31.1 |
| r$_7$ | 1142.1 | d$_7$ | 12.67 | n$_5$ | 1.73400 | ν$_5$ | 51.5 |
| r$_8$ | −47.123 | d$_8$ | 0.85 | | | | |
| r$_9$ | 714.398 | d$_9$ | 7.53 | n$_6$ | 1.69350 | ν$_6$ | 53.2 |
| r$_{10}$ | −91.252 | d$_{10}$ | 0.22 | | | | |
| r$_{11}$ | −2666.7 | d$_{11}$ | 5.68 | n$_7$ | 1.69350 | ν$_7$ | 53.2 |
| r$_{12}$ | −148.7 | d$_{12}$ | 26.35 | | | | |
| r$_{13}$ | ∞ | d$_{13}$ | 38.67 | n$_8$ | 1.51633 | ν$_8$ | 64.1 |
| r$_{14}$ | ∞ | t' | 14.5 | | | | |
| f | 100 | β | −0.12 | F | 1.8 | ω | 12.6° |
| k | −0.099 | L | 0.501 | $\overline{\Sigma}_\phi$ | −1.50 | ε | 0.996 |
| D | 92.53 | III$_2$ | 1.509 | | | | |

TABLE 12

| Radius of curvature | | Intersurface spacing | | Refractive index (Nd) | | Abbe number (νd) | |
|---|---|---|---|---|---|---|---|
| r$_1$ | 82.245 | d$_1$ | 11.66 | n$_1$ | 1.69350 | ν$_1$ | 53.2 |
| r$_2$ | 363.69 | d$_2$ | 0.13 | | | | |
| r$_3$ | 47.293 | d$_3$ | 17.35 | n$_2$ | 1.69350 | ν$_2$ | 53.2 |
| r$_4$ | 471.86 | d$_4$ | 7.17 | n$_3$ | 1.62588 | ν$_3$ | 35.7 |
| r$_5$ | 26.845 | d$_5$ | 31.7 | | | | |
| r$_6$ | −29.040 | d$_6$ | 9.47 | n$_4$ | 1.69895 | ν$_4$ | 30.1 |
| r$_7$ | 395.26 | d$_7$ | 11.79 | n$_5$ | 1.69350 | ν$_5$ | 53.2 |
| r$_8$ | −50.500 | d$_8$ | 0.2 | | | | |
| r$_9$ | −323.18 | d$_9$ | 6.74 | n$_6$ | 1.69350 | ν$_6$ | 53.2 |
| r$_{10}$ | −64.040 | d$_{10}$ | 0.17 | | | | |
| r$_{11}$ | 194.09 | d$_{11}$ | 5.71 | n$_7$ | 1.69350 | ν$_7$ | 53.2 |
| r$_{12}$ | −198.20 | d$_{12}$ | 26.35 | | | | |
| r$_{13}$ | ∞ | d$_{13}$ | 38.67 | n$_8$ | 1.51633 | ν$_8$ | 64.1 |
| r$_{14}$ | ∞ | t' | 19.26 | | | | |
| f | 100 | β | −0.12 | F | 1.8 | ω | 12.6° |
| k | −0.167 | L | 0.562 | $\overline{\Sigma}_\phi$ | −1.68 | ε | 0.925 |
| D | 102.08 | III$_2$ | 1.981 | | | | |

TABLE 13

| Radius of curvature | | Intersurface spacing | | Refractive index (Nd) | | Abbe number (νd) | |
|---|---|---|---|---|---|---|---|
| r$_1$ | 82.385 | d$_1$ | 12.58 | n$_1$ | 1.69350 | ν$_1$ | 53.2 |
| r$_2$ | 372.67 | d$_2$ | 0.13 | | | | |
| r$_3$ | 46.668 | d$_3$ | 18.25 | n$_2$ | 1.69350 | ν$_2$ | 53.2 |
| r$_4$ | 395.72 | d$_4$ | 7.08 | n$_3$ | 1.62588 | ν$_3$ | 35.7 |
| r$_5$ | 25.784 | d$_5$ | 31.60 | | | | |
| r$_6$ | −29.351 | d$_6$ | 9.30 | n$_4$ | 1.69895 | ν$_4$ | 30.1 |
| r$_7$ | 170.67 | d$_7$ | 12.60 | n$_5$ | 1.69350 | ν$_5$ | 53.2 |
| r$_8$ | −49.351 | d$_8$ | 0.20 | | | | |
| r$_9$ | −488.460 | d$_9$ | 7.38 | n$_6$ | 1.69350 | ν$_6$ | 53.2 |
| r$_{10}$ | −71.185 | d$_{10}$ | 0.17 | | | | |
| r$_{11}$ | 209.871 | d$_{11}$ | 10.00 | n$_7$ | 1.69350 | ν$_7$ | 53.2 |
| r$_{12}$ | −160.00 | d$_{12}$ | 26.35 | | | | |
| r$_{13}$ | ∞ | d$_{13}$ | 38.67 | n$_8$ | 1.51633 | ν$_8$ | 64.1 |
| r$_{14}$ | ∞ | t' | 21.22 | | | | |
| f | 100 | β | −0.12 | F | 1.8 | ω | 12.6° |
| k | −0.192 | L | 0.577 | $\overline{\Sigma}_\phi$ | −1.78 | ε | 0.956 |
| D | 109.28 | III$_2$ | 2.556 | | | | |

TABLE 14

| Radius of curvature | | Intersurface spacing | | Refractive index (Nd) | | Abbe number (νd) | |
|---|---|---|---|---|---|---|---|
| r$_1$ | 88.445 | d$_1$ | 12.58 | n$_1$ | 1.69350 | ν$_1$ | 53.2 |
| r$_2$ | 393.78 | d$_2$ | 0.13 | | | | |
| r$_3$ | 47.949 | d$_3$ | 18.25 | n$_2$ | 1.69350 | ν$_2$ | 53.2 |
| r$_4$ | 512.30 | d$_4$ | 7.08 | n$_3$ | 1.62588 | ν$_3$ | 35.7 |
| r$_5$ | 27.407 | d$_5$ | 34.23 | | | | |
| r$_6$ | −28.041 | d$_6$ | 9.30 | n$_4$ | 1.69895 | ν$_4$ | 30.1 |
| r$_7$ | 245.39 | d$_7$ | 12.60 | n$_5$ | 1.69350 | ν$_5$ | 53.2 |
| r$_8$ | −45.079 | d$_8$ | 0.20 | | | | |
| r$_9$ | −494.74 | d$_9$ | 7.38 | n$_6$ | 1.69350 | ν$_6$ | 53.2 |
| r$_{10}$ | −76.798 | d$_{10}$ | 0.17 | | | | |
| r$_{11}$ | 186.20 | d$_{11}$ | 10.00 | n$_7$ | 1.69350 | ν$_7$ | 53.2 |
| r$_{12}$ | −184.06 | d$_{12}$ | 26.35 | | | | |
| r$_{13}$ | ∞ | d$_{13}$ | 15.17 | n$_8$ | 1.51633 | ν$_8$ | 64.1 |
| r$_{14}$ | ∞ | t' | 20.70 | | | | |
| f | 100 | β | −0.12 | F | 1.8 | ω | 12.6° |
| k | −0.197 | L | 0.586 | $\overline{\Sigma}_\phi$ | −1.89 | ε | 0.909 |
| D | 111.92 | III$_2$ | 1.815 | | | | |

The aberrations shown in FIG. 23 are those for d-line corresponding to the lens data of Table 9, and in the graph of astigmatism, the broken line indicates the meridional ray and the solid line indicates the sagittal ray. This reading lens system, in spite of being of a great aperture, has well maintained spherical aberration and distortion and suffers from less flare occurring around the picture plane and has a high resolving power.

We claim:

1. An apparatus for reading a colored image on the surface of an original, comprising:
   light source means for illuminating the surface of the original;
   light detecting means;
   a transmitting optical system for separating the light beam from the surface of the original into a light beam of short wavelength zone and a light beam of long wavelength zone and directing them to said light detecting means;
   a processing circuit for effecting an operation between the signals from said light detecting means and obtaining a plurality of signals; and
   a circuit for converting said plurality of electrical signals into signals corresponding to predetermined colors;
   the overall spectral characteristic of a system comprising said light source means, said transmitting optical system and said light detecting means satisfying $$540 \text{ nm} \leq [\lambda'b + \lambda'r](\lambda'b + \lambda'r)/2 \leq 600 \text{ nm}$$

$$60 \text{ nm} \leq \lambda'r - \lambda'b \leq 260 \text{ nm}$$

where λ'b is a wavelength exhibiting a maximum transmission factor of the light beam of short wavelength zone and λ'r is a wavelength exhibiting a maximum transmission factor of the light beam of long wavelength zone.

2. An apparatus according to claim 1, wherein $$0.18 \leq \frac{Pb(F)}{Pb'} \leq 1.0$$

$$0.4 \leq \frac{Pr(C)}{Pr'} \leq 1.0$$

where Pb(λ) represents a curve exhibiting the overall spectral characteristic of said short wavelength zone, Pr(λ) represents a curve exhibiting the overall spectral characteristic of said long wavelength zone, $Pb(\lambda'b)=Pb'$, $Pr(\lambda'r)=Pr'$, $Pb(F)$ is the value of $Pb(\lambda)$ for F line, and $Pr(C)$ is the value of $Pr(\lambda'r)$ for C line.

3. An apparatus according to claim 2, which satisfies $$0.8 \leq \frac{Qb}{Qr} \leq 2.7$$

where Qr and Qb represent the areas of the regions which said $Pr(\lambda)$ and $Pb(\lambda)$ surround with horizontal axis in a predetermined wavelength range.

4. An apparatus according to claim 3, wherein $$0 \leq \frac{Qc}{Qr} \leq 0.5$$

where Qc is the area of the region in which said $Pr(\lambda)$ and $Pb(\lambda)$ overlap each other.

5. An apparatus for reading a colored image on the surface of an original, comprising:
   light detecting means;
   a lens system for imaging the light beam from the surface of the original on said light detecting means, said lens system comprising, in succession from the original surface side to the image plane side, a first positive meniscus lens having its convex surface facing the original surface side, a second meniscus lens consisting of a second-first positive lens and a second-second negative lens cemented together and having its convex surface facing the original surface side, a third meniscus lens consisting of a third-first negative lens and a third-second positive lens cemented together and having its convex surface facing the light detecting means side, a fourth positive lens and a fifth positive lens;
   means disposed between said imaging lens system and said light detecting means for separating the light beam from said imaging lens system into a light beam of short wavelength zone and a light beam of long wavelength zone;
   a processing circuit for effecting an operation between the signals from said light detecting means and obtaining a plurality of signals; and
   a circuit for converting said plurality of electrical signals into signals corresponding to predetermined colors.

6. An apparatus according to claim 5, wherein between the focal length f and the full length D of said imaging lens system, the following relation is satisfied:

$0.9 < D/f < 1.3$.

* * * * *

UNITED STATES PATENT AND TRADEMARK OFFICE
CERTIFICATE OF CORRECTION

PATENT NO. : 4,517,589
DATED : May 14, 1985
INVENTOR(S) : TAKESHI BABA, ET AL.

It is certified that error appears in the above-identified patent and that said Letters Patent is hereby corrected as shown below:

Column 9, line 17, change "mear" to --near--.

Column 14, line 5, change "and" to --and the--.

Column 16, line 49, delete "[λ'b+ λ'r]".

Signed and Sealed this

Twenty-eighth Day of January 1986

[SEAL]

Attest:

DONALD J. QUIGG

Attesting Officer

Commissioner of Patents and Trademarks